United States Patent [19]

Zhao et al.

[11] Patent Number: 5,930,720
[45] Date of Patent: Jul. 27, 1999

[54] COMMUNICATION METHOD, COMMUNICATION APPARATUS, AND CORDLESS TELEPHONE APPARATUS

[75] Inventors: Min Zhao, Abiko; Hiroyuki Ishida, Ichikawa; Takahiro Kudo; Hideo Hikuma, both of Chiba, all of Japan

[73] Assignee: Uniden Corporation, Tokyo, Japan

[21] Appl. No.: 08/605,811

[22] Filed: Feb. 22, 1996

[30] Foreign Application Priority Data

Oct. 26, 1995 [JP] Japan ................................. 7-279028

[51] Int. Cl.[6] ........................................... H04Q 7/20
[52] U.S. Cl. ........................ 455/464; 455/450; 455/453
[58] Field of Search ................................. 455/464, 466, 455/462, 450, 451, 452, 453, 455

[56] References Cited

U.S. PATENT DOCUMENTS

| | | | |
|---|---|---|---|
| 4,894,856 | 1/1990 | Nakanishi et al. | 455/464 |
| 5,044,010 | 8/1991 | Frenkiel et al. | . |
| 5,237,603 | 8/1993 | Yamagata et al. | 455/464 |
| 5,375,163 | 12/1994 | Kamimoto et al. | 455/464 |
| 5,418,839 | 5/1995 | Knuth et al. | 455/464 |
| 5,513,248 | 4/1996 | Evans et al. | 455/466 |
| 5,644,621 | 7/1997 | Yamashita et al. | 455/464 |
| 5,774,805 | 6/1998 | Zicker | 455/450 |

FOREIGN PATENT DOCUMENTS

| | | |
|---|---|---|
| 61-244137 | 10/1986 | Japan . |
| 61-280130 | 12/1986 | Japan . |
| 62-85525 | 4/1987 | Japan . |
| 62-91033 | 4/1987 | Japan . |
| 64-2428 | 1/1989 | Japan . |
| 64-55925 | 3/1989 | Japan . |
| 6-507058 | 8/1994 | Japan . |

*Primary Examiner*—Dwayne D. Bost
*Assistant Examiner*—Tracy M. Legree
*Attorney, Agent, or Firm*—McDermott, Will & Emery

[57] ABSTRACT

A cordless telephone set having a base unit and handset units and enabling communications using a channel selected from a plurality of channels. The cordless telephone set comprises apparatus for storing a specified number of channels selected by the telephone apparatus and storing historical channel use data. Whether or not a channel is unused is determined and channels used with high frequency with the data stored in the first storage are changed to those used with low frequency according to the historical use data. Channels that are stored are progressively specified prior to a start of call and a specified channel is selected, if it is determined that the channel is an unused one.

21 Claims, 14 Drawing Sheets

FIG. 3

| LOWER 4 BITS OF ID | INITIAL CONNECTION CHANNEL |
|---|---|
| 0 0 0 0 | 1, 17, 33 |
| 0 0 0 1 | 2, 18, 34 |
| 0 0 1 0 | 3, 19, 35 |
| 0 0 1 1 | 4, 20, 36 |
| 0 1 0 0 | 5, 21, 37 |
| 0 1 0 1 | 6, 22, 38 |
| 0 1 1 0 | 7, 23, 39 |
| 0 1 1 1 | 8, 24, 40 |
| 1 0 0 0 | 9, 25, 1 |
| 1 0 0 1 | 10, 26, 2 |
| 1 0 1 0 | 11, 27, 3 |
| 1 0 1 1 | 12, 28, 4 |
| 1 1 0 0 | 13, 29, 5 |
| 1 1 0 1 | 14, 30, 6 |
| 1 1 1 0 | 15, 31, 7 |
| 1 1 1 1 | 16, 32, 8 |

CHANNEL DATA TRANSFER COMMAND FROM BASIC UNIT TO HANDSET UNIT

| DUMMY | FRAME | ID | CHECK BIT | CHANNEL DATA | DUMMY |
|---|---|---|---|---|---|
| 2 BITS | 9 BITS | 16 BITS | 4 BITS | 80 BITS | 1 BIT |

CHANNEL DATA SECTION

| CH | 1 | 2 | 3 | 4 | ...... | 10 | 11 | 12 | ...... | 31 | 32 | 33 | ...... | 38 | 39 | 40 |
|---|---|---|---|---|---|---|---|---|---|---|---|---|---|---|---|---|
| | A | B | D | D | ...... | B | B | C | ...... | A | C | A | ...... | B | A | D |

A : 00, B : 01, C : 10, D : 11

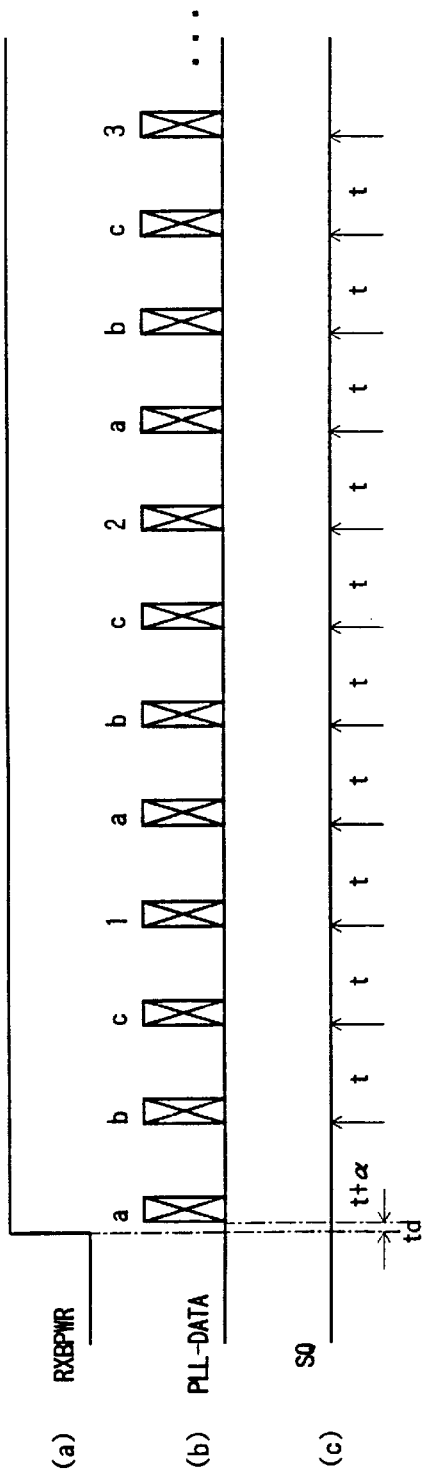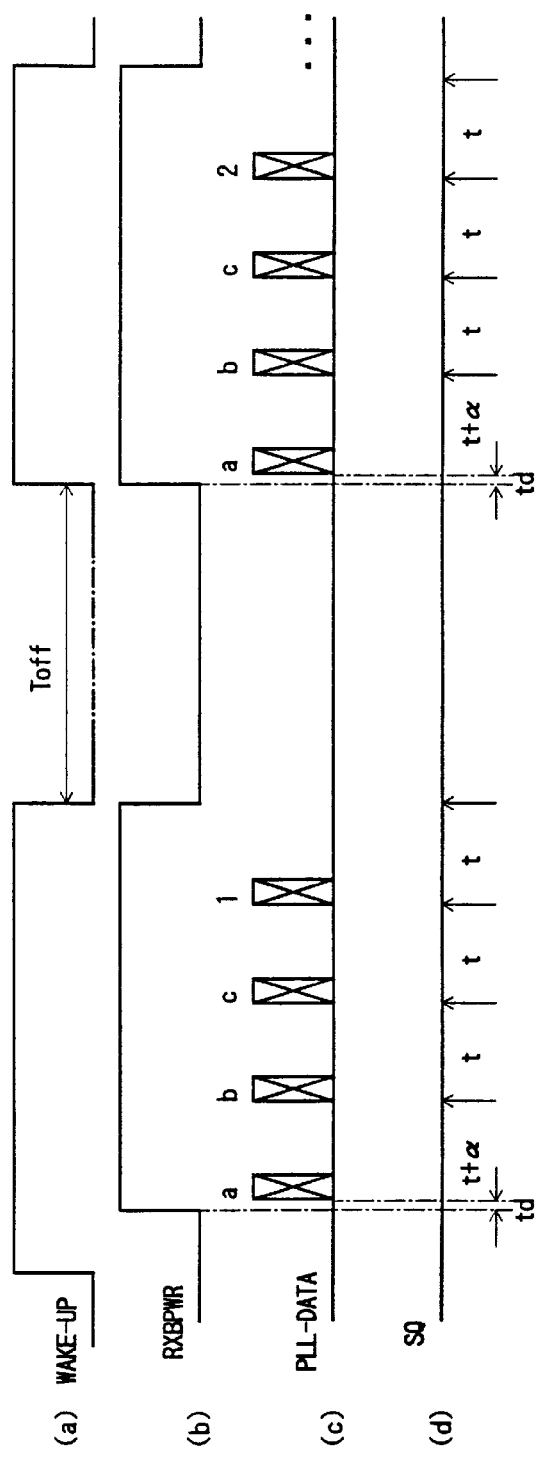

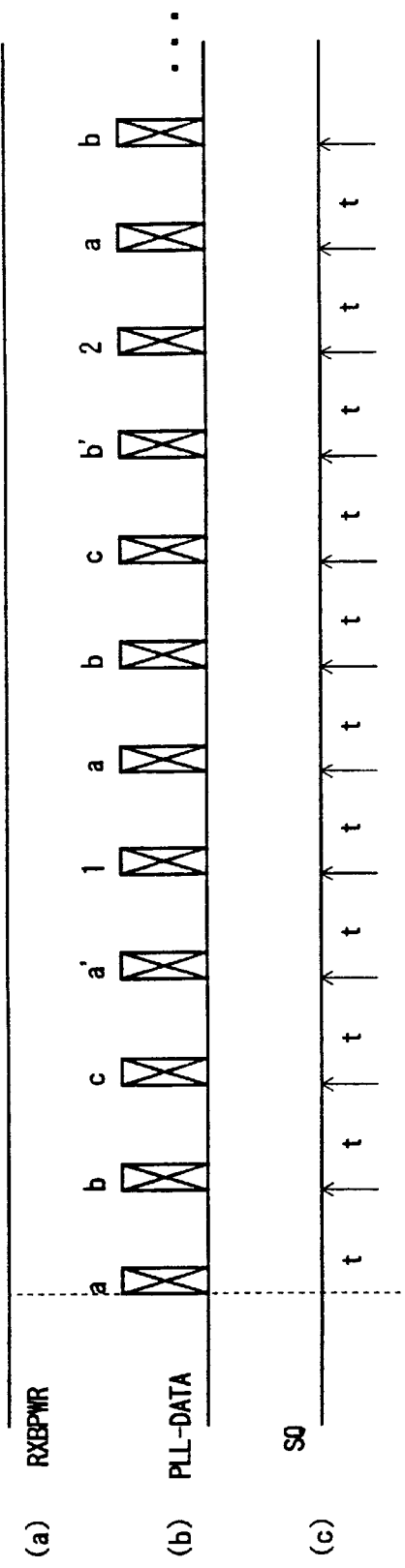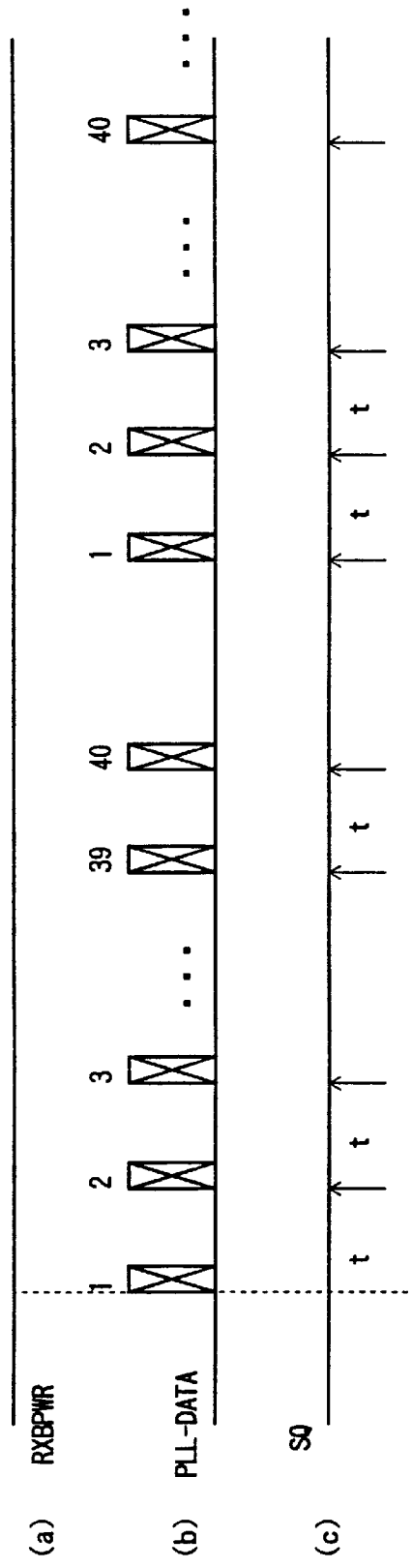

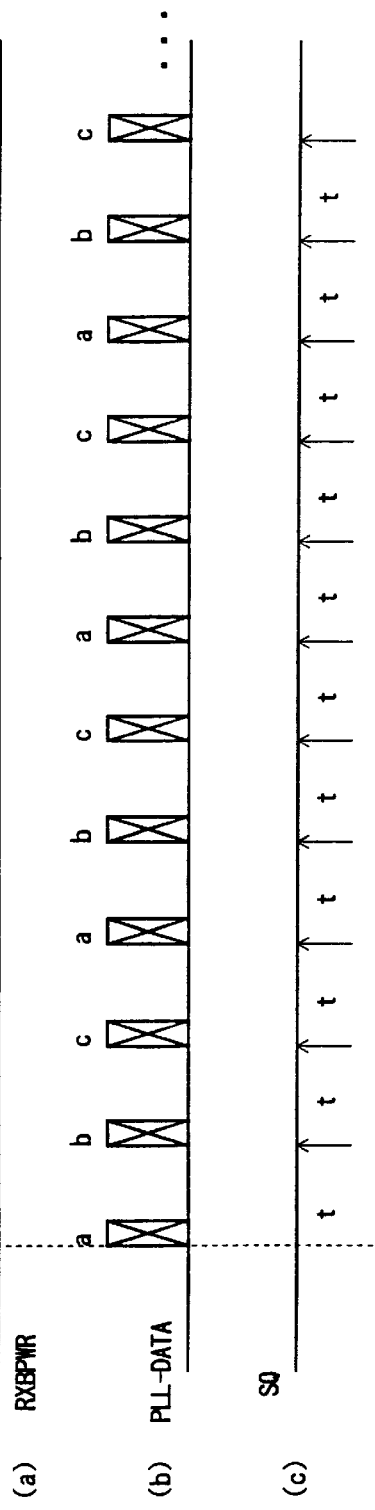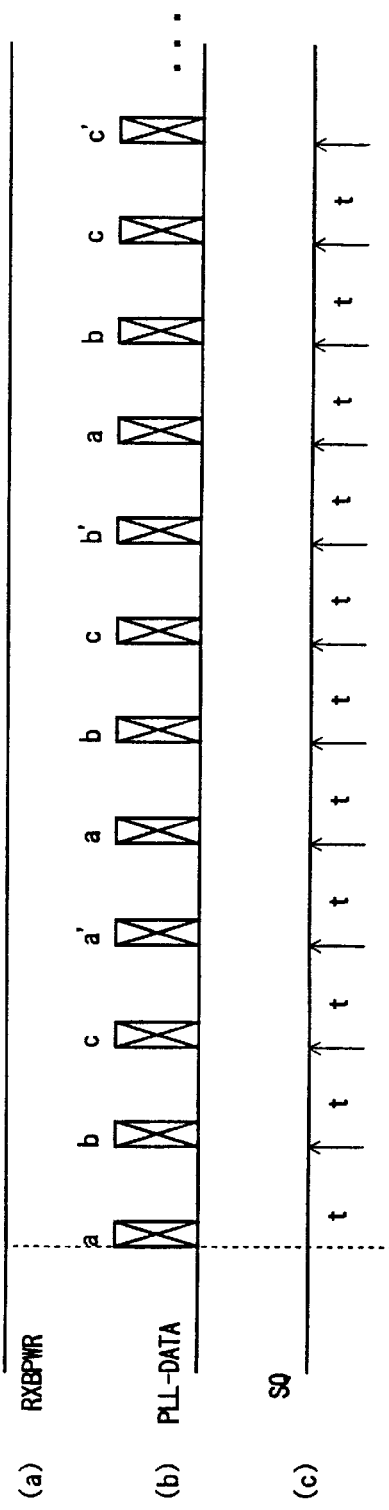
FIG. 7A CONNECTION CHANNEL SEARCH IN HANDSET UNIT (DURING CHARGING)
FIG. 7B CONNECTION CHANNEL SEARCH IN BASE UNIT
a', b', c' : CONNECTION CHANNEL BEFORE UPDATE OF CHANNEL

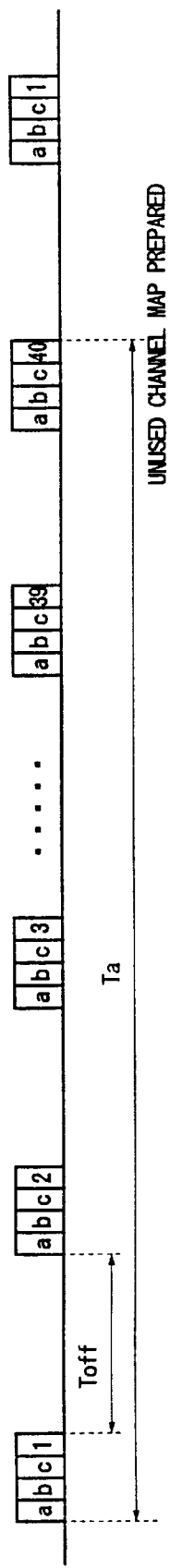
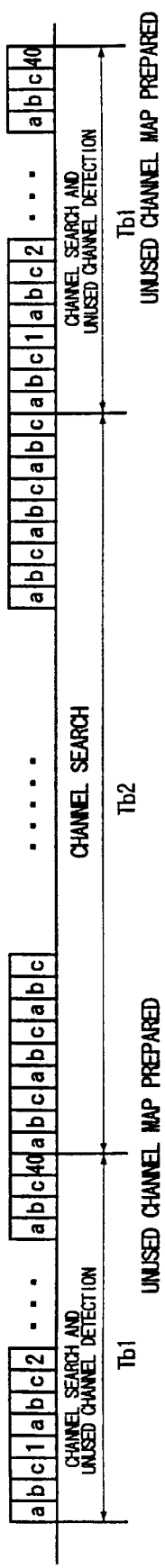

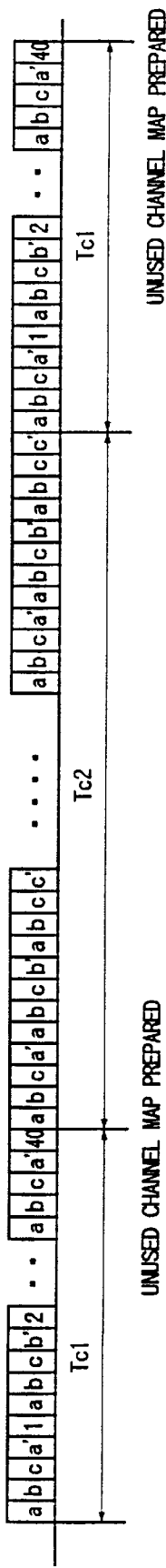
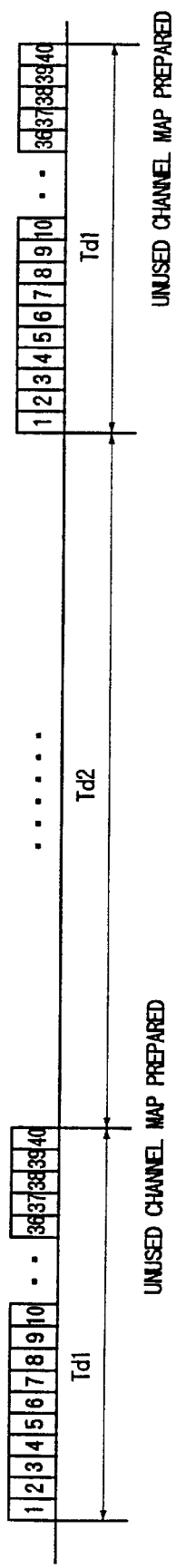
FIG. 9A
CONNECTION CHANNEL SEARCH AND UNUSED CHANNEL DETECTION IN BASE UNIT
FIG. 9B
UNUSED CHANNEL DETECTION TIMING CHART IN BASE UNIT WHILE HANDSET UNIT IS IN CHARGE
a, b, c : CURRENT CONNECTION CHANNEL
a', b', c' : CONNECTION CHANNEL BEFORE UPDATE OF CHANNEL

[5,930,720]

COMMUNICATION METHOD, COMMUNICATION APPARATUS, AND CORDLESS TELEPHONE APPARATUS

This patent application is the subject of a submission under the Disclosure Document Program, which was filed thereunder by applicants on Oct. 31, 1994 and identified as Disclosure Document No. 364342 with its accompanying fee paid under the provisions of all the Rules and Regulations including 37 CFR §1.21(c).

FIELD OF THE INVENTION

The present invention relates to a communication method based on the MCA (Multi-Channel Access) system in which one channel is selected from a plurality of channels for executing communications, a communication apparatus, and a cordless telephone apparatus. The invention more particularly is directed to a communication method in which interference between channels can be suppressed more securely, channel selection can be executed more efficiently, and also unused channel detection during the channel selecting operation described above is efficiently executed. The time required until a call connection is established is accordingly reduced, and power is saved in association with an intermittent receiving operation. The invention also concerns a communication apparatus based on the communication method described above, and a cordless telephone apparatus based on that.

BACKGROUND OF THE INVENTION

As a conventional type of radio communication method based on the MCA system, a method in which a priority order is assigned to each channel, and channels having higher priority order are progressively used, or a method in which that priority order is dynamically decided according to historical data concerning use of each channel is disclosed, for instance, in Japanese Patent Publication No. 59039/1994.

However, in this conventional type of radio communication method based on the MCA system, a priority order is given to each of all channels which can be used for sending or receiving calls. Unused channel detection is progressively executed for all the channels according to the priority order, and hence a long time is required for assigning a priority order to each channel or dynamically updating the priority order according to historical use data. A long time is also required until call connection is established, which impedes power saving.

Also, for instance, in a case where a cordless telephone apparatus having a base unit and a handset unit is used for business or in the similar environment, if a period of time in which the cordless telephone apparatus is used includes any holiday including Saturday, Sunday, or a national holiday, historical use data concerning priority order is homogenized among all base units and all handset units. In some types of environment, dynamic updating of priority order according to historical use data becomes meaningless, and interference between channels can not be suppressed.

SUMMARY OF THE INVENTION

It is an object of the present invention to provide a communication method in which interference between channels can be suppressed more securely, channel selection can be executed more efficiently, and power consumption can be reduced by efficiently executing unused channel detection during channel selection to reduce the time required until call connection is established in association with an intermittent receiving operation, and to provide a communication apparatus and a cordless telephone apparatus in which the method described above is applicable.

It is another object of the present invention to provide a communication method in which actual use is accurately reflected to historical use data, dynamic updating of priority order according to historical use data is accurately executed regardless of use environment, and interference between channels can securely be suppressed, as well as to provide a communication apparatus and a cordless telephone apparatus in which the method described above is applicable.

As described above, with the communication method, communication apparatus, and cordless telephone apparatus according to a first feature of the present invention, for each communication device, channels used at a high frequency in a first storage means are changed by the selected channel changing means to those used at a low frequency according to historical use data stored in a second storage means in a called communication device and historical use data stored in the second storage means in its own communication device. When sending or receiving a call between any communication devices in a plurality of communication devices, a control means progressively specifies channels stored in the first storage means, requires a determining means to make a determination, and selects, if it is determined that the specified channel is an unused channel, the specified channel which is used to send or receive a call. A scan for an unused channel is executed by limiting candidates for selected channels to a specified number of channels on which data based on how often used is controlled. This makes it possible to efficiently select channels, and channel selection and detection for unused channels are efficiently executed prior to a call, whereby the time required for making a call can be reduced. As a result, with operation for intermittent receiving, power consumption can be reduced, and further candidate channels for selection are limited with reference to historical use data stored not only in its own communication device but also in a called communication device. It is thus possible to provide a communication method, a communication apparatus, and a cordless telephone set in which data based on how often they are actually used in the communication system, can be correlated to historical use data, and interference between channels.

Also with the communication apparatus and the cordless telephone apparatus according to a second feature of the present invention, a historical use data stored in the second storage means is obtained by sampling data for a certain period of time, so that data based on how often they are actually used can more accurately be correlated to the historical use data of the channels.

With the communication apparatus and the cordless telephone apparatus according to a third feature of the present invention, the historical use data stored in the second storage means is obtained by sampling data a specified number of times. Discrepancies in sampling times between communication devices (a base unit and a handset unit) accordingly do not occur, and it becomes possible to collect more accurate historical use data.

With the communication apparatus and the cordless telephone apparatus according to a fourth feature of the present invention, the historical use data stored in the second storage means is accumulated with historical use data collected in the previous sampling cycle and weighted at a specified rate once for a specified period of time or once for every specified sampling time, so that the entire historical use data in the past is accumulated. This makes it possible to more accurately correlate data based on how often they are actually used, to the historical use data.

With the cordless telephone apparatus according to a fifth feature of the present invention, candidate channels for selection are changed by the selected channel changing means, after sampling is executed for a specified period of time or times, when a first call ends. Hence, even when using a cordless telephone apparatus having a base unit and a handset unit in an environment such as business use or the like over a weekend or holidays such as a public holiday, or when historical use data is not uniform in all base and handset units, data based on how often they are actually used is reliably correlated thereto, dynamic update of candidate channels for selection based on priority order can accurately be executed and interference between channels can securely be suppressed.

With the cordless telephone set according to a sixth feature of the present invention, prior to a call the control means progressively specifies a channel stored in the first storage means and a third storage means, requires the determining means to make a determination, selects, if it is determined that the specified channel is an unused channel, the specified channel. The selected channel is used to send and receive a call thereby, so that even in a case where there are discrepancies in candidate channels for selection between a base unit and a handset unit, or there is no response from the other side to a call sent through a channel selected for those stored in the first storage means, a channel is selected from the third storage means change is executed by the selected channel changing means. Hence, the inconveniences as described above can be suppressed, and this makes it possible to efficiently select channels, and at the same time more securely transfer the situation to a call connected state.

Other objects and features of this invention will become understood from the following description with reference to the accompanying drawings.

BRIEF DESCRIPTION OF THE DRAWINGS

FIG. 3 is an explanatory view of candidate channels for selection (initialization) for each ID in the connection between the base unit and the handset unit in the cordless telephone apparatus according to an embodiment thereof;

FIGS. 5A and 5B are timing charts for explanation of operations for connection channel search as well as for unused channel detection in a handset unit, where FIG. 5A shows a state of charging and FIG. 5B shows a state of off-charging;

FIG. 6A is a timing chart for explanation of operations for connection channel search as well as for unused channel detection in a base unit during off-charging, and FIG. 6B is a timing chart for explanation of an operation for detecting unused channels in the base unit during charging;

FIG. 7A is a timing chart for explanation of an operation for connection channel search in a handset unit during charging, and FIG. 7B is a timing chart for explanatory of an operation for connection channel search in the base unit during off-charging;

FIGS. 8A and 8B are timing charts for explanation of operations for connection channel search as well as for unused channel detection in a handset unit, where FIG. 8A shows a state of off-charging and FIG. 8B shows a state of charging;

FIG. 9A is a timing chart for explanation of operations for connection channel search as well as for unused channel detection in a base unit during off-charging, and FIG. 9B is a timing chart for explanation of an operation for detecting unused channels in the base unit during charging;

DESCRIPTION OF THE PREFERRED EMBODIMENTS

Figure 1:
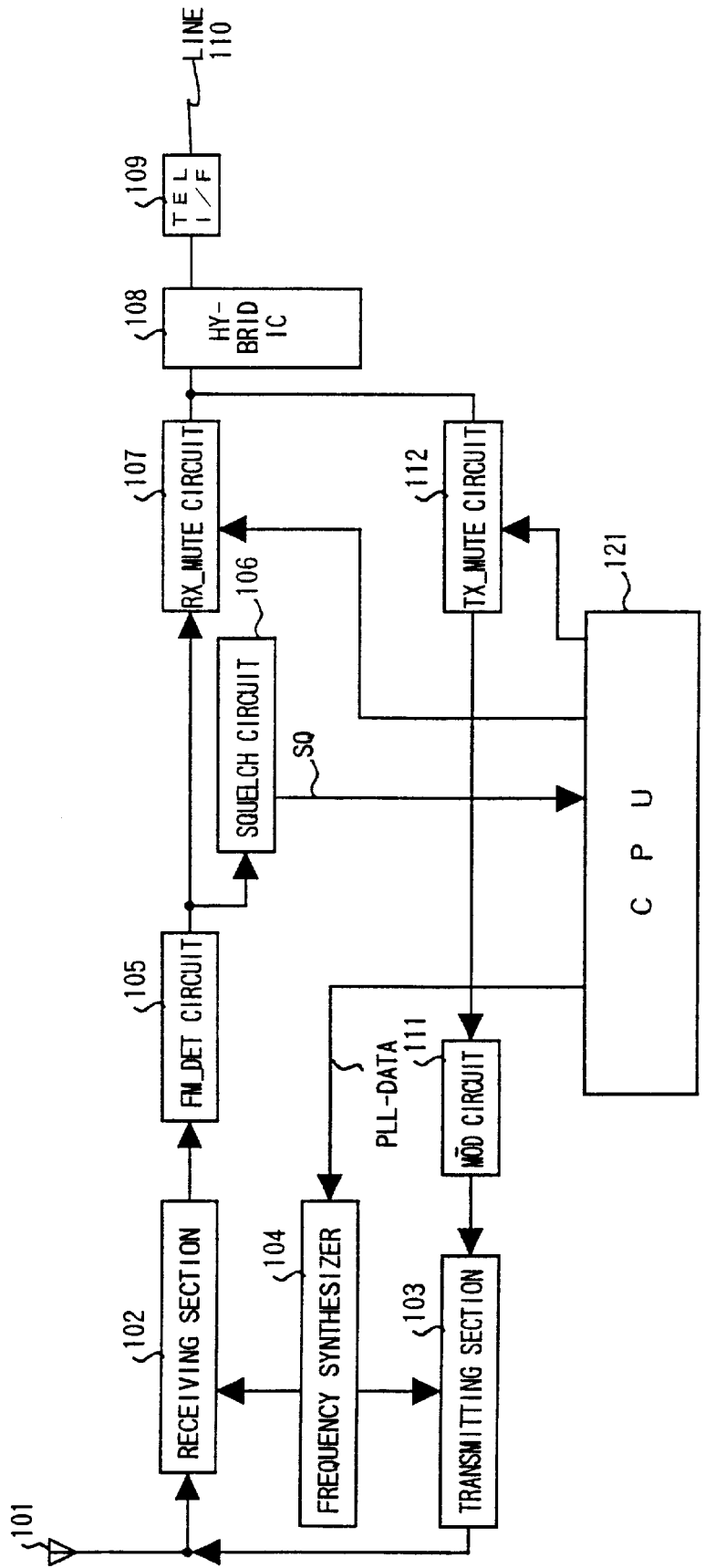
FIG. 1 is a block diagram showing a base unit in a cordless telephone apparatus according to an embodiment of the present invention.

A detailed description is made hereinafter for outline of the communication method according to the present invention as well as for outline of a communication apparatus and a cordless telephone apparatus in which the method is applicable, and also for one embodiment of the communication method, a communication apparatus and a cordless telephone apparatus based on the communication method with reference to the related drawings.

In the convention according to a first feature of the present invention, for each communication device, a specified number of channels, selected by the communication device from among a plurality of channels, which are allocated to the communication device and are allowed to be used for communication are stored in a first storage means. Historical use data for each of the plurality of channels used by other communication devices is stored in a second storage means. Channels used with high frequency in the first storage means are changed by a selected channel changing means to those used with low frequency according to historical use data stored in the second storage means in a called communication device and historical use data stored in the second storage means in its own communication device. When sending and receiving a call between any communication devices among a plurality of communication devices, a control means progressively specifies channels stored in the first storage means, requires a determining means to make a determination, and selects, if it is determined that the specified channel is an unused channel, the specified channel, which is used to send and receive a call. It should be noted that a cordless telephone set according to the first feature of the present invention provides a communication device comprising a base unit and a handset unit.

As described above, a scan for an unused channel is executed by limiting candidate channels for selection to a specified number of channels to which use conditions are reflected, which makes it possible to efficiently select channels, and operations for channel selection as well as for unused channel detection are efficiently executed prior to a call. The period of time required for establishing call connection can therefore be reduced, and as a result, also in association with intermittent receiving operation, power consumption can be reduced. Also, candidate channels for selection is limited with reference to historical use data stored not only in the communication device but also a called communication device, so that actual use conditions in the communication system can reliably be correlated to the historical use data, which makes it possible to realize a communication method, a communication apparatus, and a cordless telephone apparatus in which interference between channels can reliably be suppressed.

Also in a communication apparatus and a cordless telephone apparatus according to a second feature of the present invention, it is desired that the historical use data stored in the second storage means is regarded as historical use data obtained by sampling data for a certain period of time.

In a communication apparatus and a cordless telephone apparatus according to a third feature of the present invention, it is desired that the historical use data stored in the second storage means is regarded as historical use data obtained by sampling data specified number of times. In a method of sampling data for a certain period of time, in a case where a call is connected during data sampling, slight discrepancies may occur in sampling times between communication devices (a base unit and a handset unit), but the discrepancies as described above do not occur by dividing a sampling cycle by sampling times, whereby more accurate historical use data can be collected.

In a communication apparatus and a cordless telephone apparatus according to a fourth feature of the present invention, it is desired that the historical use data stored in the second storage means is accumulated with historical use data collected in the previous sampling cycle weighted at a specified rate once for a specified period of time or once for all specified sampling times. With this configuration, all historical use data in the past is accumulated, which makes it possible to more accurately reflect data on how often they are actually used to the historical use data.

In a cordless telephone apparatus according to a fifth feature of the present invention, it is desired that a change of candidate channels for selections by the selected channel changing means is executed, after sampling is executed for a specified period of time or specified times, when a first call ends.

With this configuration, even when using a cordless telephone apparatus having a base unit and a handset unit in an environment such as for business use or the like over a weekend or holidays such as a public holiday, the historical use data is not made uniform in the base unit and handset units, data on how often they are actually used is accurately correlated thereto, dynamic update of candidate channels for selection according to the priority order depending on the historical use can accurately be executed regardless of any use environment, and interference between channels can reliably be suppressed.

In a cordless telephone apparatus according to a sixth feature of the present invention, contents of the first storage means before channel change is executed by the selected channel changing means is stored in a third storage means of the base unit and handset unit, prior to a call. The control means progressively specifies channels stored in the first storage means and the third storage means, requires the determining means to make a determination, selects, if it is determined that the specified channel is an unused channel, the specified channel, which is used to make a call.

With this configuration, even where there are discrepancies in candidate channels for selection between a base unit and a handset unit, or there is no response from the other side, namely the receiving side, to the call sent from one side with a selected channel in the first storage means, a channel is selected from the third storage means storing candidate channels for selection before channel change is executed by the selected channel changing means. Hence, disadvantages as described above can be suppressed, which makes it possible to efficiently select channels and at the same time to more accurately transfer the situation to a state of call.

Next, a detailed description is made for an embodiment of a cordless telephone apparatus according to the present invention with reference to the related drawings.

FIG. 1 is a block diagram showing a base unit in a cordless telephone apparatus according to an embodiment of the present invention. In FIG. 1, a base unit of the cordless telephone apparatus according to the present embodiment comprises an antenna 101, a receiving section 102, a transmitting section 103, a frequency synthesizer 104, a frequency detector (FM_DET circuit) 105, a squelch circuit 106, a receiving mute circuit (RX_MUTE circuit) 107, a hybrid IC 108, a line interface (TEL I/F) 109, modulation circuit (MOD circuit) 111, a transmission mute circuit (TX_MUTE circuit) 112, and a CPU (a control means and a selected channel changing means) 121.

It should be noted that, in FIG. 1, PLL-DATA indicates data for a phase synchronizing loop circuit supplied by the CPU 121 to the synthesizer 104, and SQ indicates a result of squelch check for a received signal executed in the squelch circuit 106. Also it should be noted that the base unit is connected via the line interface 109 to a line 110.

Figure 2:
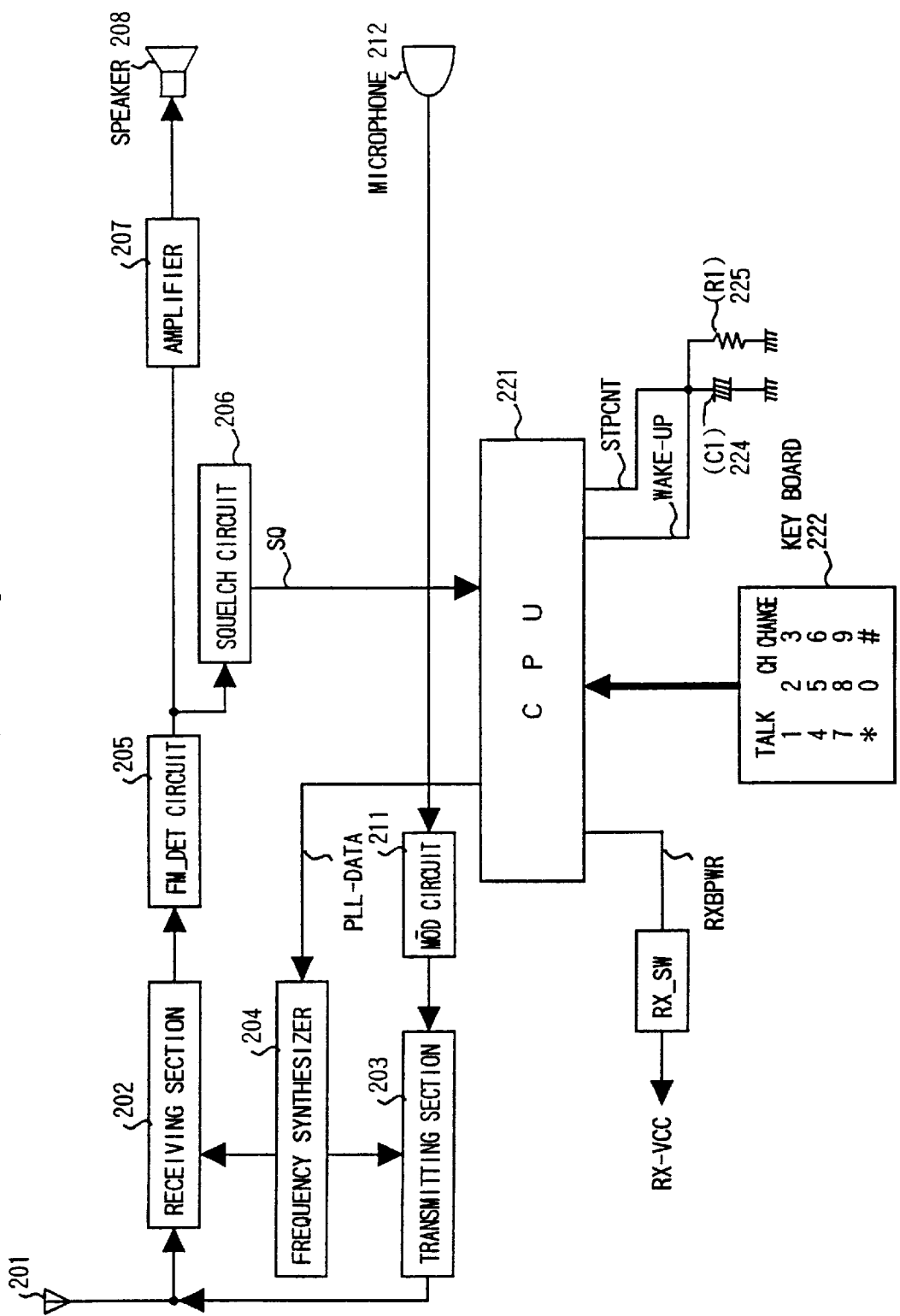
FIG. 2 is a block diagram showing a handset unit in the cordless telephone apparatus according to an embodiment thereof.

FIG. 2 is a block diagram showing a handset unit in the cordless telephone apparatus according to the present embodiment. In FIG. 2, the handset unit in the cordless telephone apparatus according to the preset invention comprises an antenna 201, a receiving section 202, a transmitting section 203, a frequency synthesizer 1204, a frequency detector (FM_DET circuit) 205, a squelch circuit (a determining means as defined in Claims) 206, an amplifier 207, a speaker 208, a modulation circuit (MOD circuit) 211, a microphone 212, a CPU (a control means and a selected channel changing means as defined in Claims) 221, a keyboard 222, a receiving section power switch (RX_SW) 223, an electrolytic capacitor 224 (capacity: C1), and a resistor 225 (resistance value: R1).

It should be noted that, in FIG. 2, PLL-DATA indicates control data given from the CPU 221 to a phase synchronizing loop (PLL) circuit in the frequency synthesizer 204, and SQ indicates a result of squelch check for a received signal executed in the squelch circuit 206. RXBPWR indicates a control signal for the receiving section power switch 223, and from the receiving section power switch 223 RX-VCC ON/OFF controlled for power supply to a receiving system such as the receiving section 202 is outputted.

Furthermore, the electrolytic capacitor 224 and resistor 225 form a circuit for controlling an intermittent operation in intermittent receiving, namely a scan operation, and the electrolytic capacitor 224 is charged when a stop control signal STPCNT is set to "TH" level, is discharged with a time constant of (C1×R1) when the stop control signal STPCNT is set to open potential, and is set to "L" level in a certain period of time based on the time constant, and returns to the sleep mode when a signal WAKE-UP is at the "H:active" level.

FIG. 3 is a chart showing correspondence between candidate channels for selection for each ID in connection between a base unit and a handset unit in a cordless telephone apparatus according to the present embodiment. Herein a number of channels which can be used when sending or receiving a call with the cordless telephone apparatus according to the present embodiment is totally 40 channels from the channel 1 to channel 40, and candidate channels for selection are grouped using lower 4 bits of ID code assigned to the base unit and handset unit, respectively. A number of candidate channels for selection and allocated to each base unit or each handset unit is 3 channels, and for instance, channels 1, 17 and 33 are allocated to a base unit or a handset unit each having lower 4 bits of "0000" of ID code as initialization candidate channels for selection.

A base unit and a handset unit in this embodiment have a storage means (not shown) accessed by the CPU 121 in the base unit and a storage means (not shown) accessed by the CPU 221 in the handset unit respectively, and the storage means are realized, for instance, with such a device as ROM, for example. Namely, the candidate channels for selection described above are stored in a specified region of this storage means of base unit and handset unit.

Also provided in another specified region of the storage means described above are 1-byte software counters in correspondence to 40 channels from channel 1 to channel 40 to store historical use data for channels used by other telephone sets. If it is determined in squelch check by the squelch circuit 106 or 206 during unused channel detection described later that a channel is busy, the corresponding software counter is incremented. With this feature, count values, which are contents of the software counter, are accumulated therein as historical use data.

The historical use data is updated once for every sampling cycle decided according to a period of times or a times of data sampling. There are various methods of updating, and in the present invention historical use data obtained during a previous sampling cycle is weighted at a specified rate and then accumulated. More concretely, when data obtained during a previous sampling cycle is updated, a minimum integral value exceeding a half of the historical use data (count obtained by the counter) during the previous sampling cycle is remained. With this feature, all of historical use data in the past is accumulated, and actual situation in use of each channel can accurately be reflected to historical use data.

Furthermore, stored in the other region of the storage means are candidate channels for selection before changed by the selected channel changing means.

The CPU 121 or CPU 221 realizes at least functions of the selected channel changing means as well as of the control means. Namely, a function of the selected channel changing means is to change channels used at a high frequency among the candidate channels for selection to those used at a low frequency according to historical use data stored in a software counter. It should be noted that change of the candidate channels for selection in the CPU 221 in a handset unit is executed according to historical use data stored in a software counter in the side of a base unit as well as to historical use data stored in a software counter in the side of the telephone set (handset unit).

A function of the control means is to search for a channel for connection prior to start sending or receiving a call. At first, candidate channels for selection are progressively specified, in other words PLL-DATA for the specified channels is supplied to a frequency synthesizer 104 or 204 to make the squelch circuit 106 or 206 execute squelch check. Then a squelch signal SQ, which is a result of the squelch check, is received, and whether the specified channel is unused or busy is determined. Then, if it is determined that the specified channel is an unused one, this specified channel is selected, and communication is executed using the selected channel.

It should be noted that, in a case where, when sending or receiving a call, a determination is requested to the squelch circuit 106 or 206 by progressively specifying current candidate channels for selection in the first storage means and old candidate channels for selection in the third storage means. If it is determined that the specified channel is an unused channel, communication may be executed by selecting the specified channel and sending or receiving a call using the specified channel. In this embodiment, channels for connection are searched according to the method similar to that described above. The details are described later.

Old candidate channels are referred to as described above because a case where a specified group number in a base unit is different from that in a handset unit, or where a call is sent through the specified channel but no response is received from the called side is anticipated, and necessary measures can be taken against the case as described above by referring to the old candidate channels for selection. With this feature, it is possible to efficiently select a channel for calling and also to establish a call connection more securely.

Furthermore, as described later, the CPU 121 or 221 also execute unused channel detection for accumulating historical used data. During the sampling cycle described above, 40 channels from channel 1 to channel 40 are progressively specified to determine whether the specified channel is unused or busy, and the result of determination is accumulated as historical use data in a software counter.

As described above, when the CPU 221 in a handset unit changes candidate channel for selection, the CPU 221 also refers to historical use data stored in a software counter in the base unit. For this reason, it is necessary to transfer historical use data stored in the base unit from the base unit to the handset unit, but to reduce a quantity of data to be transferred and also to uniform the quantity, and furthermore to simplify treatment by the CPU 121, the CPU 121 in the side of base unit makes evaluation by grouping historical use data in the software counter. In other words, each channel is grouped to any of the following four groups according to a count provided by the software counter:

Group A: A group of channels with the lowest frequency of use (Call loss ratio: 0.1% or less)

Group B: A group of channels with a substantially low frequency of use (Call loss ratio: 0.1 to 1%)

Group C: A group of channels with a slightly low frequency of use (Call loss ratio: 1 to 3%)

Group D: A group of channels used at a high frequency (Call loss ratio: 3% or more)

Also to realize the call loss ratio for each of the groups described above, as candidates channels for selection are three channels in this embodiment, a use rate of each group is as follows:

Group A: 10% or less

Group B: 10 to 21.5%

Group C: 21.5 to 31%

Group D: 31% or more

Herein it is assumed that a sampling cycle is around 3 hours or about 150 sampling times. As described later, the above two values assumed above are those use in actual design, and these two values indicates a substantially equational sampling cycle. In the assumption described above, a relation between each group and a value counted by a software counter in 1 sampling cycle is substantially as described below:

Group A: 0 to 15

Group B: 16 to 31

Group C: 32 to 46

Group D: 47 or more

Figure 4A:
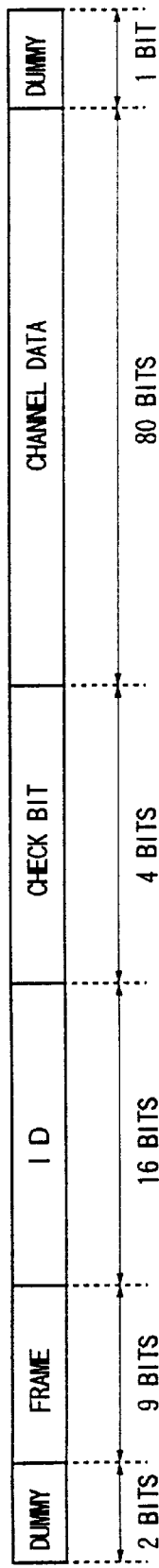
FIGS. 4A and 4B are explanatory views of a format for a channel data transfer command from the base unit to the handset unit.
Figure 4B:
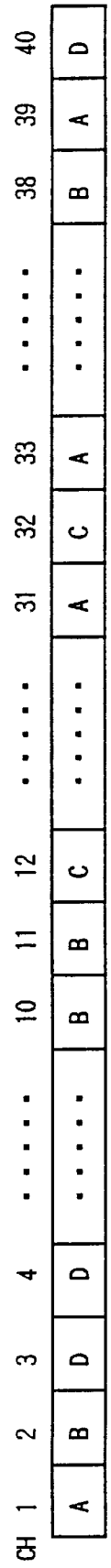

Under the evaluation as described above, when historical use data for a channel in a base unit is sent from the base unit to a handset unit, the historical use data is transferred with the command format as shown in FIGS. 4A and 4B. FIG. 4A shows a format of a historical channel use data transfer command from a base unit to a handset unit, while FIG. 4B shows a format of a channel data section in the format shown in FIG. 4A. It should be noted that A, B, C, and D in FIG. 4B correspond to each group name described above respectively.

Next, a description is made for a method of changing candidate channels for selection by the CPU 121 in a base unit. When it is determined according to historical use data stored in a software counter in the base unit that the first, second, and third channels, which are candidate channels for selection, are those with a high frequency of use, the channels are changed to those with a low frequency of use. Then all the first, second, and third channels may be changed, or only a portion of the channels may be changed.

When changing candidate channels, new channels can be selected as those with a low frequency of use (those belonging to group A), for instance, by searching channels to be changed in the descending order. For instance, in FIG. 3, when changing the second channel "24" in a case where lower four bits of the ID code is "0111", software counters are searched from 23 to 22 and so on in the descending order, and if the channel "16" is a first channel belonging to group A, the second channel is changed from "24" to "16".

As another method, there is a method in which specific channels are previously specified for each of 40 channels, and new channels are selected by searching the prespecified channels in the descending order.

Next, a description is made for a method of changing candidate channels for selection with the CPU 221 in a handset unit. When it is determined according to historical use data stored in a software counter in the handset unit as well as to historical use data stored in and transferred from a base unit that the first, second, and third channels, which are candidate channels for section, are those with a high frequency of use, the channels are changed to those with a low frequency of use. A method of selecting new channels is described below.

For instance, assuming that the following historical use data $\alpha$ has been transmitted from a base unit according to the format of the channel data section in FIG. 4B;

α: 00, 01, 10, 11, . . . , 01, 00, 11 and also that the historical use data β stored in the handset unit is as follows;

β: 00, 00, 01, 00, . . . , 11, 00, 00 candidate channels for selection are changed as described below with CPU 121 in the handset unit.

At first, the historical use data $\alpha$ and $\beta$ are summed up to obtain the following data:

α+β=000, 001, 011, 011, . . . , 100, 000, 011 Herein a basic principle of channel updating is to change channels with a high frequency of use, which are to be changed, to those with a low frequency of use, so that the lowest channel obtained as a result of the addition above is selected.

If there are a plurality of channels each having an identical value, from combinations of a group of base units and that of handset units each according to a frequency of use, a combination of groups of channels used at a lower frequency is selected. For instance, when selecting a channel having data of "010" as a result of addition, if there are a first channel having data of 010 as a result of addition (A (00)+C (10)=010) and a second channel also having data of 010 as a result of addition (B (01)+B (01)=010), the second channel is selected. If there is no channel having a data value, which is a result of addition, lower than that of the channel to be changed, change of candidate channels for selection is not executed.

Next, a description is made for operations for searching connection channels and for detecting unused channels in a handset unit as well as in a base unit with reference to the timing charts shown in FIGS. 5A, 5B and FIGS. 6A, 6B.

FIGS. 5A and 5B show timing charts explaining operations for searching connection channels as well as for detecting unused channels in a handset unit. In a handset unit, intermittent receiving is executed in the normal use mode to reduce power consumption in a secondary battery provided in the handset unit. For this reason, intermittent receiving is executed or not executed according to whether the second battery is in off charging or in charge respectively, and accordingly the operation for detecting unused channels is executed according to a different sequence.

FIG. 5A is a timing chart showing operations for searching connection channels and for detecting unused channels during charging. At first a control signal RXBPWR is set to an active level, and supply of power to a receiving system is started. Then, a search for connection channels is executed. Namely for first, second, and third channels a, b, c, which are candidate channels for selection, PLL-DATA for the channels is supplied to the frequency synthesizer 204, squelch check is executed by the squelch circuit 206 and whether the channel is unused or busy is determined according to a squelch signal SQ. Then, if it is determined that the channel is an unused channel, this channel is selected and call connection is established.

A detection of an unused channel is executed using a time space in this search for connection channel. Namely, detection for an unused channel for channel 1 is executed between a first search for connection channel and a second search for connection channel, then detection for an unused channel for channel 2 is executed between a second search and a third search, and thus detection for an unused channel is progressively executed for channel 1 to channel 40.

FIG. 5B is a timing chart showing operations for searching connection channel as well as for channel detection during off-charging. At first, while the signal WAKE-UP is at an active level, the control signal RXBPWR is set to an active level, and power supply to the receiving system is started. Namely, intermittent receiving, in which receiving is executed only while the signal WAKE-UP is at an active level and receiving is not executed during a period of T off, is executed.

In a period for receiving a call once, a search for connection channels is executed in relation to first, second, and third channels a, b, and c, which are candidate channels for selection, and then in the remaining time, unused channel detection is executed for one channel from channel 1 to channel 40. Namely, unused channel detection for channel 1 is executed after a first connection channel search, unused channel detection for channel 2 is executed after a second connection channel search, and thus unused channel detection for channel 1 to channel 40 is progressively executed.

Next, a description is made for operations for searching connection channels as well as for detecting unused channels in a base unit. FIG. 6A is a timing chart showing operations of a base unit while a handset unit is in the off charge state.

When the control signal RXBPWR is at an active level and power is being supplied to a receiving system, at first a search for connection channels is executed. Namely, for first, second, and third candidate channels for selection a, b, and c, PLL-DATA for the channels is supplied to the frequency synthesizer 104 to make the squelch circuit 106 execute squelch check for the purpose to determine according to a squelch signal SQ whether the channels are unused or busy. In this step, if it is determined that any of the channel is an unused one, this channel is selected and call connection is established.

Then for one of the old first, second, and third candidate channels for selection a', b', and c', search for connection channels is executed. Namely, after first search for connection channel with current candidate channels for selection that for the channel "a" is executed, and then second search for connection channels with current candidate channels for selection, that for the channel "b" is executed. Thus, a search for connection channels is executed cyclically as described above, and if it is determined that the channel is an unused channel, this channel is selected and call connection is established.

Detection for an unused channel is executed using a time space between connection channel search with current candidate channels for selection and that with old candidate channels for selection. Namely unused channel detection for channel 1 is executed between first connection channel search and second connection channel search with current candidate channels for selection and old candidate channels for selection. Then unused channel detection for channel 2 is executed between second connection channel search and third connection channel search, and thus unused channel detection for channel 1 to channel 40 is progressively executed.

FIG. 6B is a timing chart showing an operation for detecting unused channels in a base unit while a handset unit is in charge. When a handset unit is in charge, a call is not sent from the handset unit, so that connection channel search is not executed. Namely, unused channel detection is progressively executed for channel 1 to channel 40.

Then, a description is made for a sampling cycle for unused channel detection. When forming a cordless telephone apparatus having a base unit and handset units as described above, it is necessary to reflect actual used conditions to historical use data stored in the base unit and handset units as much as possible. For that purpose, it is necessary to set a sampling cycle to an identical period of time or identical times of sampling both in the base unit and handset units regardless of where any handset unit is in charge or in off charge.

Among the operations of a base unit and a handset unit while the handset unit is in charge or in off charge respectively, an operation requiring the longest period of time in unused channel detection for 40 channels from channel 1 to channel 40 is that during intermittent receiving, namely an operation of a handset unit while the handset unit is in off charge, and the timing chart is as shown in FIG. 8A. Then the sampling cycle is Ta, and a count obtained by the software counter is updated (an unused channel map is prepared) after the sampling cycle has passed.

In operations by a handset unit for connection channel search and unused channel detection while the handset unit is in charge, the time Tb1 required for unused channel detection for 40 channels through the operations described in relation to FIG. 5A is shorter than the sampling cycle Ta, and of the sampling cycle Ta, in a period of time Tb2 obtained by subtracting Tb1 from Ta (Ta−Tb1=Tb2), connection channel search is executed. Namely, the operations for connection channel search and unused channel detection as shown in FIG. 5A are executed only in the period Tb1, and then an operation for connection channel search shown in FIG. 7A is executed only in the period Tb2, and thus the sampling cycle Ta is realized according to the timing shown in FIG. 8B. It should be noted that a count obtained by the software counter (an unused channel map is prepared) is updated after the period Tb1 has passed.

In operations of a base unit for connection channel search as well as for unused channel detection while a handset unit is in off charge, a period of time Tc1 required for detecting unused channels for 40 channels from channel 1 to channel 40 by means of the operation described in relation to FIG. 6A is shorter than the sampling cycle Ta, and of the sampling cycle Ta, in a period of time Tc2 obtained by subtracting Tc1 from Ta (Ta−Tc1=Tc2), connection channel search is executed with the current candidate channels for selection and also with the old candidate channels for selection. Namely, the operations for connection channel search and for unused channel detection as shown in FIG. 6A are executed only in the period Tc1, then the operation for connection channel search as shown in FIG. 7B is executed only in the period Tc2, and thus the sampling cycle Ta is realized according to the timing shown in FIG. 9A. It should be noted that a count obtained by the software counter is updated (an unused channel map is prepared) after the period Tc1 has passed.

Furthermore, in operations of a base unit for unused channel detection while a handset unit is in charge, a period of time Td1 required in unused channel detection for 40 channels by means of the operations described in relation to FIG. 6B is clearly shorter than the sampling cycle Ta, and of the sampling cycle Ta, in the period of time Td2 obtained by subtracting Td1 from Ta (Ta−Td1=Td2), nothing is executed. Namely, the operation for unused channel detection shown in FIG. 6B is executed only in the period Td1, and in the subsequent period Td2 nothing is done, and thus the sampling cycle Ta is realized according to the timing shown in FIG. 9B. It should be noted that a count obtained by the software counter is updated (an unused channel map is prepared) after the period Td1 has passed.

Next, description is made for a sequence of operations for connection between a handset unit and a base unit. It should be noted that a call is transmitted from a base unit in cases of call connection after an incoming call is received or of connection for answering, while a call is transmitted from a handset unit in cases of call connection in response to talk-key entry or of remote connection.

Whether any of candidate channels is available or not is confirmed by means of the operation for connection channel search described above for the current candidate channels for selection as well as for the old candidate channels for selection in a case where a call is transmitted from a base unit, or for the candidate channels for selection in a case whether a call is transmitted from a handset unit. Code is transmitted from a calling side by using a channel confirmed as an unused channel as the transmission channel, and if ACK code is returned from the called side, call connection is established using the channel continuously. If ACK code is not returned from the called side, it is determined that the transmission channel in the calling side is busy, and code transmission is repeated using other unused channel as the transmission channel.

Figure 10:
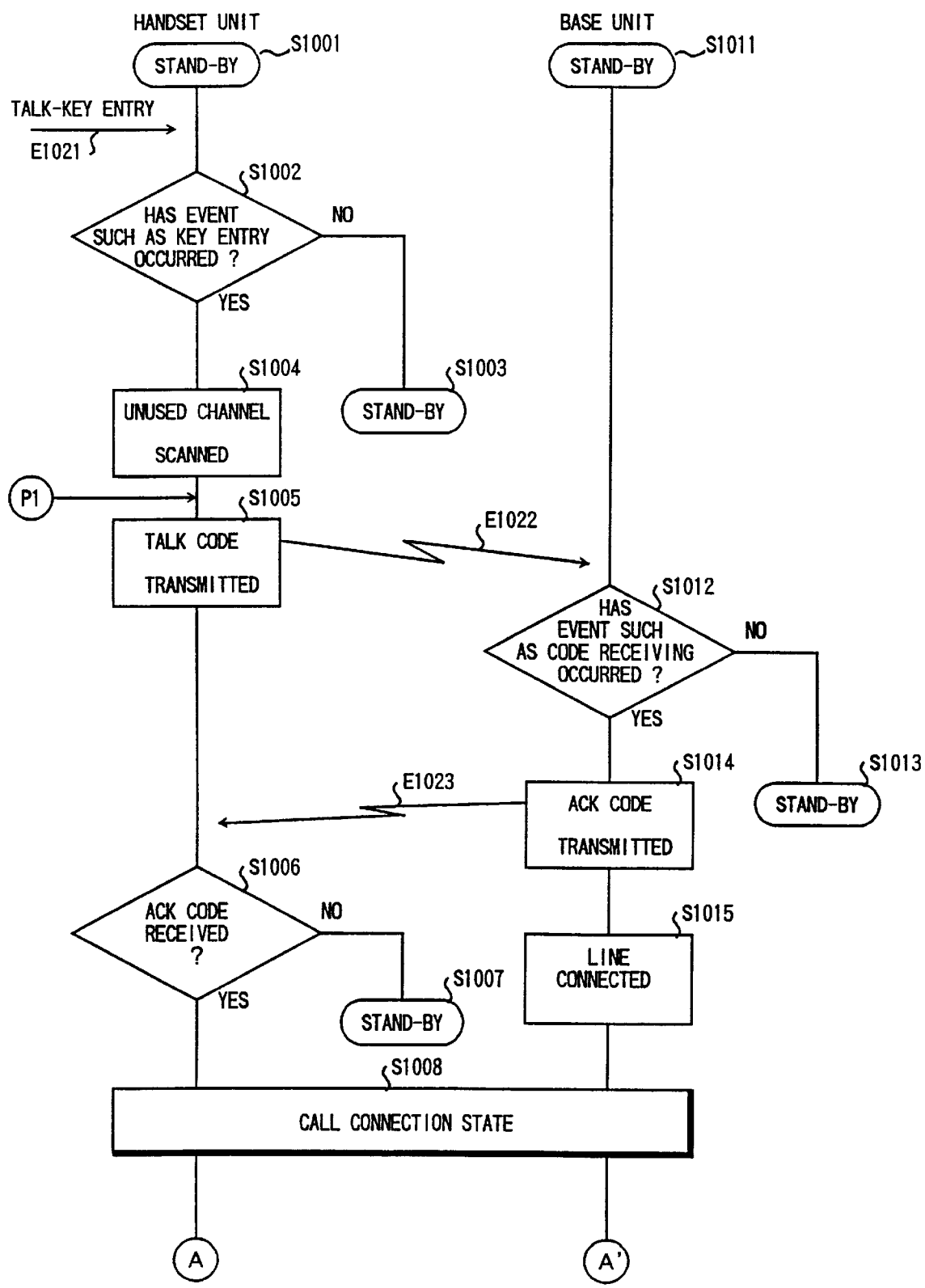
FIG. 10 is a flow chart for explanation of processing from a talk-key entry in the side of a handset unit until call connection is established in the handset unit as well as the base unit.

FIG. 10 is a flow chart showing processing in a handset unit and in a base unit since talk-key entry in the handset unit until establishment of call connection. At first, when a handset unit is in the ready state (step S1001), if the event E1021 of talk-key entry occurs, system control goes via determination in step S1002 to step S1004. In determination in step S1002, the ready state is continued until such an event as key entry occurs.

Then in step S1004, the operation for connection channel search in the side of a handset unit as described above is executed. Namely, depending on the candidate channels for selection stored in the first storage means in the handset unit, determination as to whether any of the first, second, and third channels is unused or not is made by the squelch circuit 206. Also in the step S1005, by using a channel determined as an unused one as the transmission channel, transmission request code is progressively transmitted to base units (event E1022).

In the side of a base unit, when the base unit is in the ready state (Step S1011), if the transmission event E1022 of transmission request code occurs, system control goes via determination in step S1012 to step S1014. Also in determination in step S1012, the ready state is continued until an event such as code receiving is generated.

In step S1014, transmission request ACK code indicating that the transmission event E1022 of transmission request code from a handset unit has been accepted is transmitted to the handset unit (event E1023). It should be noted that, in a case where the transmission event E1022 of transmission request code from a handset unit does not reach the base unit due to some trouble on the propagation of radio waves, or in a case where an incoming call is received and bell sound immediately before the transmission event E1022 is accepted, the transmission event E1023 of transmission request ACK code does not occur.

When the transmission event E1023 of transmission request code from a base unit is accepted, call connection is established (step S1008) via step S1006. Also in the side of base unit, line connection is established in step S1015, and call connection is established in step S1008.

Figure 11:
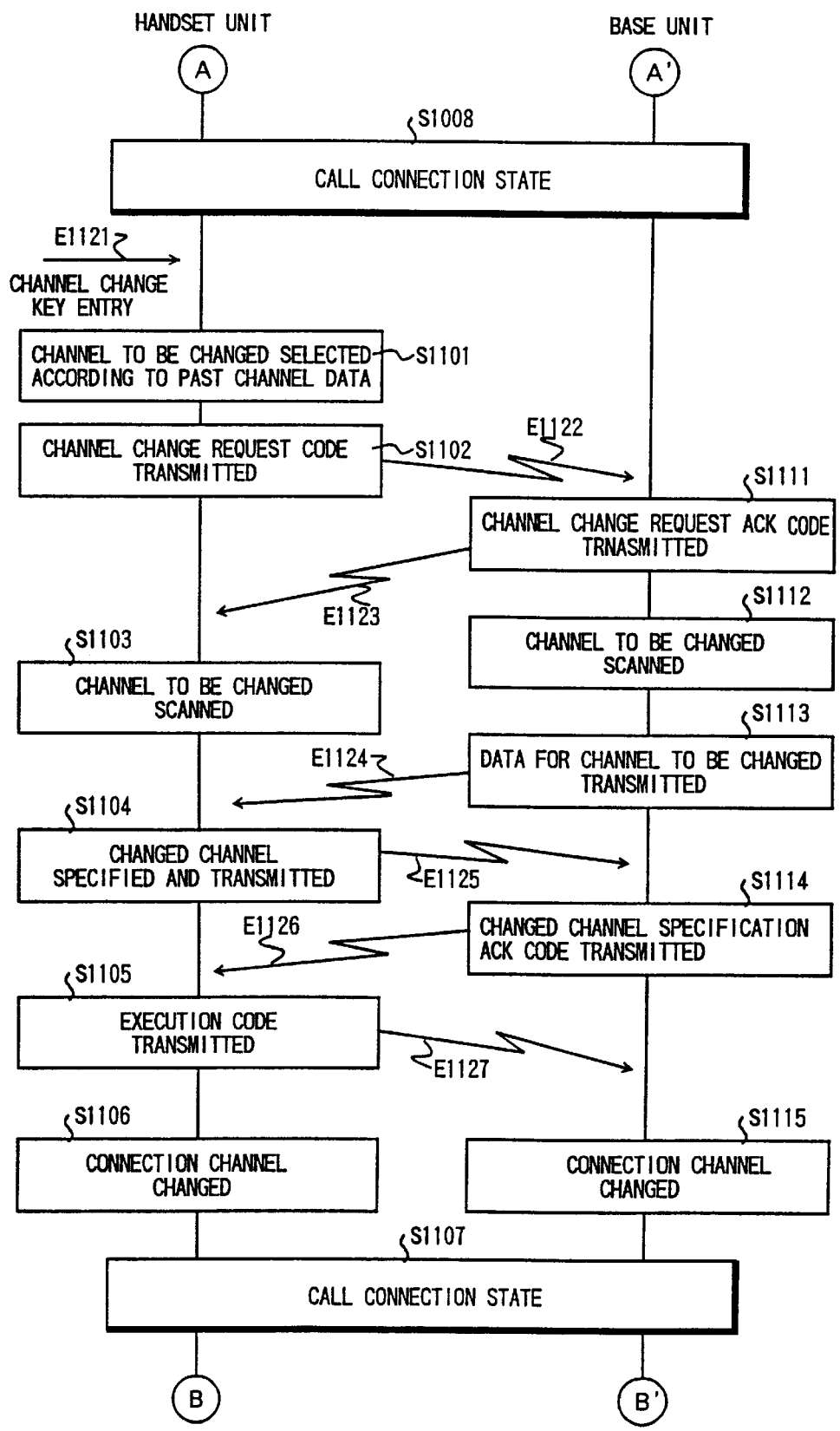
FIG. 11 is a flow chart for explanation of a sequence for changing channels when a call is connected.

FIG. 11 is a flow chart showing a sequence for channel change when the telephone set is in call connection. It should be noted that description is made hereinafter for channel change during a call. However, channel change can be executed during remote connection (for controlling a function for a phone-answering machine in the base unit from a handset unit) or during call screen connection (automatic response when receiving a call) other than during a call.

At first, when a telephone set is in call connection (step S1008), and if a channel change key provided in a key board of a handset unit is pressed (event E1121), in step S1101, a channel to be changed thereto is selected in the same sequence as the channel change executed by the selected channel changing means described above, and in step S1102 channel change request code is transmitted to the base unit (event E1122).

When accepting the transmission event E1122 of the channel change request code is accepted, the base unit transmits channel change request ACK code to the handset unit in step S1111 (event E1123).

Then, when the handset unit has accepted the transmission event E1123 of the channel change request ACK code from the base unit, in step S1103, it is checked whether the channel to be changed is unused or busy by scanning. Also the base unit scans the channel to be changed in step S1112, and furthermore transmits data of a result obtained from scanning the channel to be changed to the handset unit in step S1113 (event E1124).

Then, when accepting the transmission event E1124 of data for the channel to be changed from the base unit, the handset unit specifies the changed channel to transmit to the base unit in step S1104 (event E1125). When the base unit has accepted the transmission event E1125, a changed channel specification ACK code is transmitted to the handset unit in step S1114 (event E1126).

When accepting the transmission event E1126 of changed channel specification ACK code, the handset unit transmits an execution code to the base unit in step S1105 (event E1127). When the base unit has accepted the transmission event E1127 of the execution code, the connection channel is changed in step S1115, and also a connection channel is changed in the handset unit in step S1106, and then call connection in step S1107 is again established.

Figure 12:
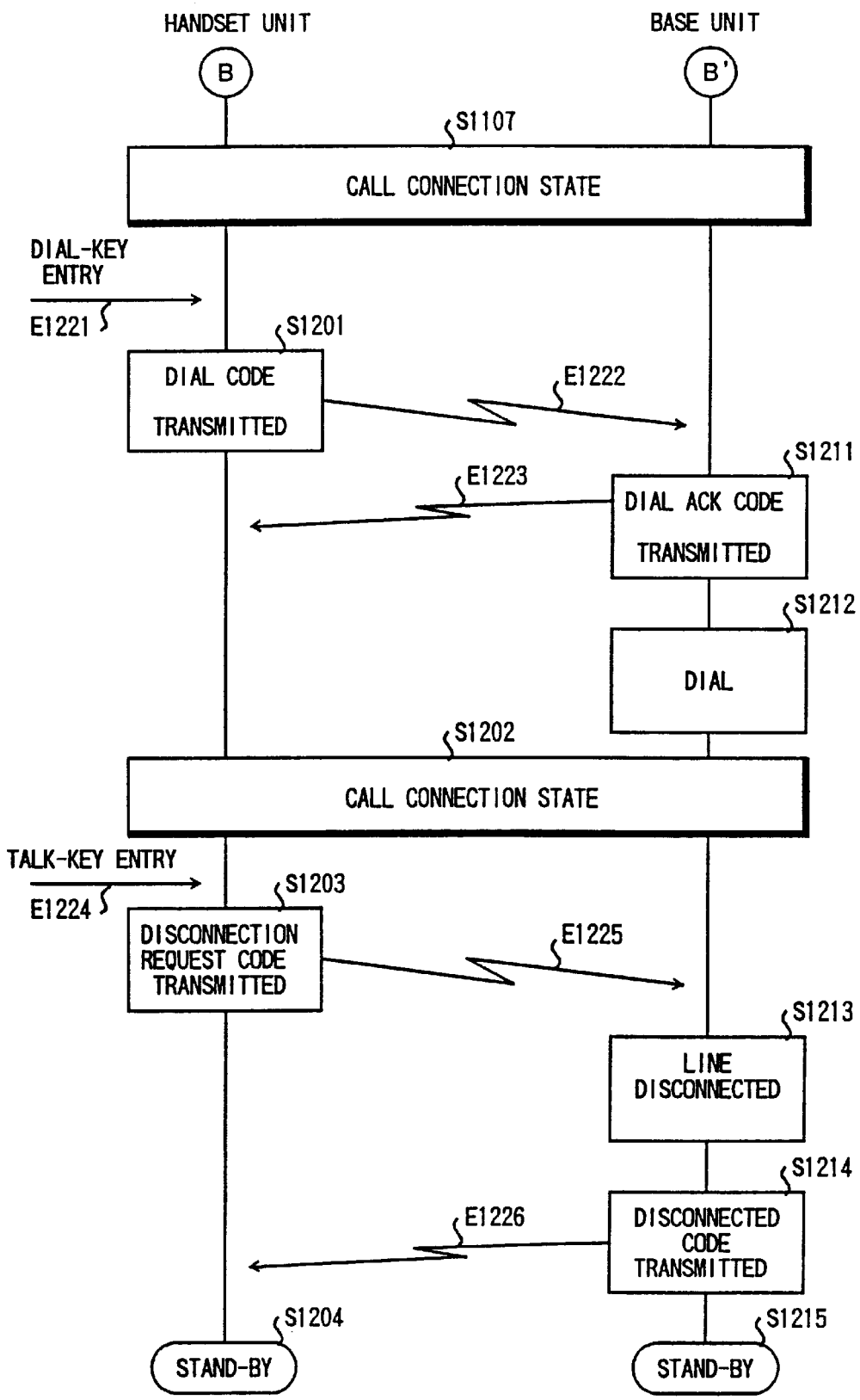
FIG. 12 is a flow chart for explanation of a sequence for disconnecting a line when the telephone set is sending and receiving a dial code, as well as, is in a state of call connection.
Figure 13:
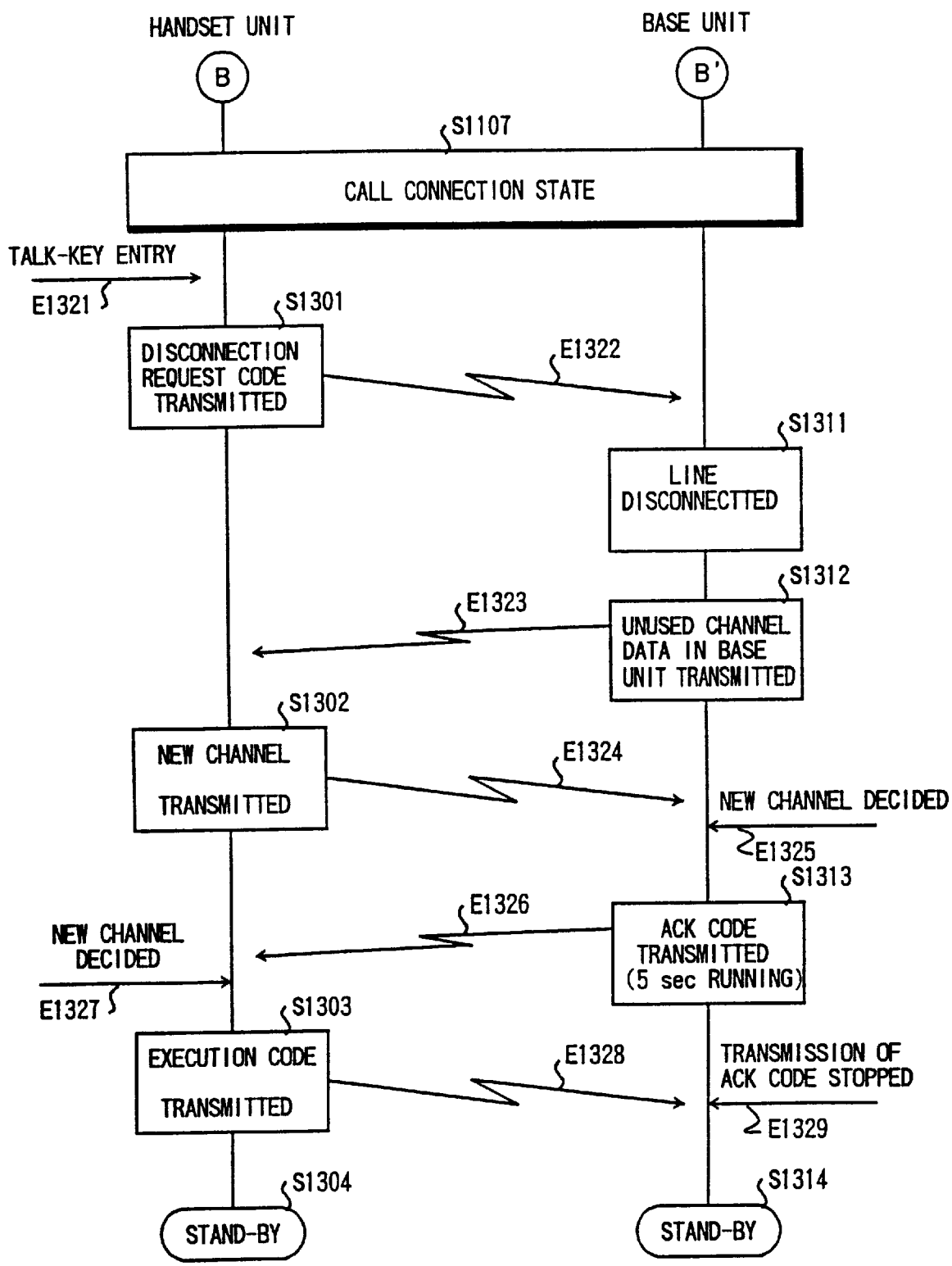
FIG. 13 is a flow chart for explanation of a sequence for disconnecting the line and updating candidate channels for selection from the state of call connection.

FIG. 12 and FIG. 13 are flow charts each showing a sequence of operations for sending and receiving a dial code, as well as, of line disconnection when the telephone set is in call connection.

In FIG. 12, operations for sending and receiving a dial code are executed as follows. At first, when a handset unit and the base unit are in call connection (step S1107), and when the handset unit performs an event E1221 of a dial-key entry, a dial code is transmitted to the base unit in step S1201 (event E1222).

When the base unit has accepted the transmission event E1222 of the dial code, a dial ACK code is transmitted to the handset unit in step S1211 (event E1223), and the base unit tries to connect to a line 110 with the dial code, and when the line has been connected, the base unit returns to call connection (step S1202). Also when accepting the transmission event E1223 of the dial ACK code from the base unit, the handset unit returns to call connection (step S1202).

When the telephone set is in call connection, line disconnection is executed as follows. At first, when a handset unit and the base unit are in call connection (step S1202), and when an event E1224 of a talk-key entry is executed in the handset unit, disconnection request code is transmitted to the base unit in step S1203 (event E1225).

When the base unit has accepted the event E1225 of the disconnection request code transmission, the line 110 is disconnected in step S1213, the disconnected code is transmitted to the handset unit in step S1214 (event E1226), and the base unit returns to the ready state for receiving a call (step S1215). While, when accepting the transmission event E1226 of the disconnected code from the base unit, the handset unit returns to the ready state for receiving a call (step S1204).

Further, after a sampling cycle for detecting an unused channel (sampling is executed for a certain period of time or specified times) has passed, the operation executed when a first call ends, namely line disconnection executed when the telephone set is in call connection is executed according to the flow chart shown in FIG. 13 because candidate channels for selection are changed each in the base unit and in a handset unit.

At first, when the handset unit and the base unit are in call connection (step S1107), if the handset unit executes an event E1321 of a talk-key entry, disconnection request code is transmitted to the base unit in step S1301 (event E1311).

When the base unit has accepted the transmission event E1322 of the disconnection request code, the line 110 is disconnected in step S1311, and data on unused channels (historical use data) in the base unit is transmitted to the handset unit (event E1323).

In the side of the handset unit, candidate channels for selection are changed according to the changing method described above depending on the historical use data in the telephone set as well as on historical use data from the base unit, and new candidate channels for selection are transmitted to the base unit in step S1302 (event E1324).

The base unit decides new candidate channels for selection for the telephone set according to new candidate channels for selection transmitted in the event E1324 from the handset unit (event E1325). Also in step S1313, the base unit transmits ACK code indicating that new candidate channels for selection have been decided to the handset unit for 5 seconds continuously (event E1326). On the other hand when accepting the transmission event E1326 of the ACK code from the base unit, the handset unit determines new candidate channels for selection (event E1327).

The handset unit transmits execution code to the base unit in step S1303 (event E1328), then the base unit stops transmitting the ACK code (event E1329), and returns to the ready state for receiving a call (step S1314). Also the handset unit returns to the ready state for receiving a call after the execution code has been transmitted (step S1304).

Figure 14:
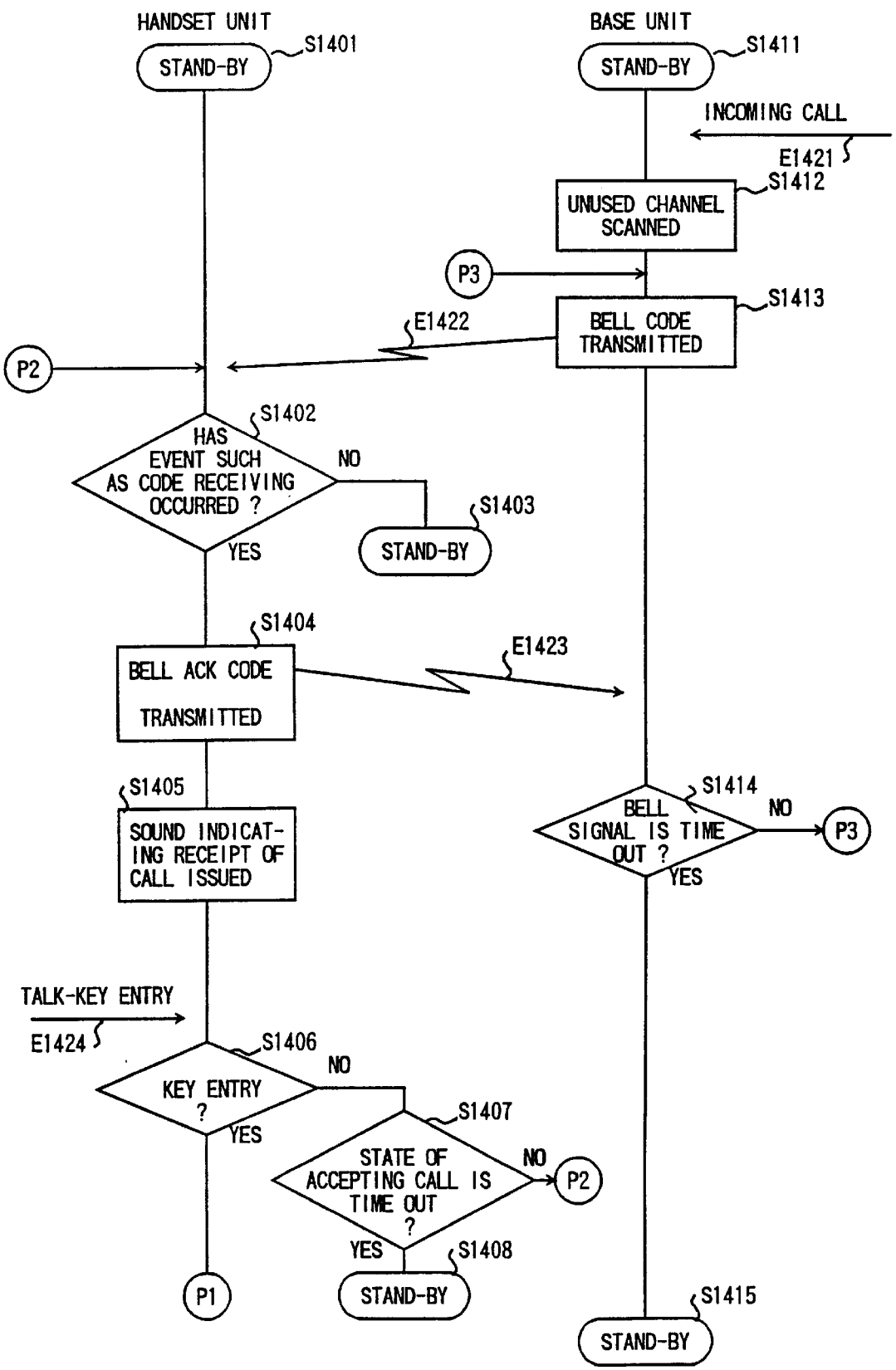
FIG. 14 is a flow chart for explanation of processing from receiving a bell for a call in the side of the base unit until call connection is established in the handset unit as well as the base unit.

FIG. 14 is a flow chart showing processing from receiving an incoming call to reaching a state where call connection is established in the base unit in both side of the base unit and the handset unit. At first, when the base unit is in the ready state for receiving a call (step S1411), and if event E1421 of receiving an incoming call occurs, system control goes to step S1412, and the operation for connection channel search described above is executed by the base unit. Namely, determination is made by a squelch circuit 106 as to whether candidate channels for selection stored in the first storage means of the base unit are unused or not.

In step 1413, the channel determined as an unused one is used as a transmission channel, whereby bell code is progressively transmitted to the base unit (event E1422).

In the side of handset unit, when the handset unit is in the ready state for receiving a call (step S1401), and if the transmission event E1422 of bell code occurs, system control goes to step S1404 through the determination in step S1402. Also the ready state for receiving a call is continued until an event such as code receiving is generated according to the determination in step S1402.

In step S1404, the handset unit transmits bell ACK code indicating that the handset unit has accepted the event transmission E1422 of the bell code from the base unit to the base unit (event E1423). It should be noted that, in a case where the transmission event E1422 of the bell code from the base unit does not reach the base unit due to some trouble on the propagation of radio waves, the event E1423 of the bell ACK code transmission is not executed.

When the base unit has accepted the transmission event E1423 of the bell ACK code from the handset unit, in step S1414 determination is made as to whether the bell signal is time out or not. In step S1414, in a case where the bell signal is not finished, system control goes back to step S1413 and the bell code is again transmitted thereto, while in a case where the bell code is finished, the base unit returns to the ready state for receiving a call (step S1415).

On the other hand, in the side of the handset unit, a sound indicating receipt of a call is issued from a bell speaker of the handset unit in step S1405 after the bell ACK code has been transmitted. Hearing the sound indicating receipt of a call from the handset unit, a user presses down the talk-key (event E1424).

Then, in step S1406, determination is made as to whether a key is entered or not, and in a case where event E1425 of a talk-key occurs, system control goes to step S1005 in FIG. 10. While in a case where there is no key-entry, system control goes to step S1407, and it is determined whether the state of accepting the call is time out or not therein. In a case where the time is not still out, then the handset unit returns to the determination in step S1402, and in a case where the time is already out, the handset unit returns to the ready state for receiving a call (step S1408).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication apparatus having a plurality of communication devices, for communicating via one of a plurality channels, each of said communication devices comprises:

a first storage area to store a specified number of channels which are allocated to said communication device and said communication device can select from among said plurality of channels;

a second storage area to store historical use data for each of said plurality of channels used by other communication devices;

a determining circuit to determine whether a specified channel is an unused channel or not;

a selected channel change circuit to change channels with a high frequency of use in said first storage area in the communication device to those with a low frequency of use according to a combination of historical use data stored in said second storage area in a called communication device and historical use data in said second storage area in the communication device; and a controller to progressively specify channels stored in said first storage area prior to start of said call, and request said determining circuit to make a determination and select, if it is determined that said specified channel is an unused channel, said specified channel.

2. A communication apparatus according to claim 1, wherein said historical use data to be stored in said second storage area is historical use data obtained by sampling for a certain period of time.

3. A communication apparatus according to claim 2, wherein said historical use data to be stored in said second storage area is accumulated with the historical use collected in the previous sampling cycle weighted at said every sampling times for certain period of time.

4. A communication apparatus according to claim 2, wherein said historical use data to be stored in said second storage area is historical use data obtained by sampling specified number of times.

5. A communication apparatus according to claim 4, wherein said historical use data to be stored in said second storage area is accumulated with the historical use collected in the previous sampling cycle weighted at said every specified sampling times.

6. The communication apparatus according to claim 2, wherein the combination of historical use data includes adding the historical use data in the second storage area in the called communication device and the historical use data in the second storage area in the communication device.

7. A cordless telephone set having a base unit and a handset unit and selecting one channel from among a plurality of channels which can be used for sending and receiving a call between said base unit and said handset unit, and executing communication using said selected channel, said base unit and said handset unit respectively comprising:

a first storage area to store a specified number of channels allocated to the telephone set and selected by the telephone set from among said plurality of channels;

a second storage area to store historical use data used by other communication devices for each of said plurality of channels;

a determining circuit to determine whether a specified channel is an unused channel;

a selected channel change circuit to change channels with a high frequency of use in said first storage area in the telephone set to those with a low frequency of use according to a combination of historical use data stored in said second storage area of said handset unit or base unit being called from the telephone set and historical use data stored in said second storage area in the calling telephone set; and a controller to progressively specify channels stored in said first storage area prior to start of said call, request determination by said determining circuit, and select, if it is determined that said specified channel is an unused channel, said specified channel.

8. A cordless telephone apparatus according to claim 7, wherein said historical use data stored in said second storage area is historical use data obtained by sampling for a certain period of time.

9. A communication apparatus according to claim 8, wherein said historical use data stored in said second storage area is accumulated with the historical use collected in the previous sampling cycle weighted at said every sampling times for certain period of time.

10. A cordless telephone apparatus according to claim 7, wherein said historical use data stored in said second storage area is historical use data obtained by sampling a specified number of times.

11. A communication apparatus according to claim 10, wherein said historical use data stored in said second storage area is accumulated with the historical use collected in the previous sampling cycle weighted at said every specified sampling time.

12. A cordless telephone apparatus according to claim 7, wherein channel change by said selected channel change circuit is executed, after sampling is executed for a specified period of time or specified times, when a first call ends.

13. A cordless telephone apparatus according to claim 7, wherein said base unit and said handset unit in said cordless telephone apparatus have a third storage area to store contents of said first storage area before channel change is executed by said selected channel change circuit, and said controller progressively specifies the channels stored in said first storage area and in said third storage area prior to start of said communication, requests determination by said determining circuit, and selects, if it is determined that said specified channel is an unused channel, said specified channel.

14. The communication apparatus according to claim 7, wherein the combination of historical use data includes adding the historical use data in the second storage area of the handset unit or base unit being called and the historical use data in the second store area in the calling telephone set.

15. A cordless telephone system having a base unit communicating with a handset unit via one of available channels, said base and handset units comprising:

a receiving circuit for receiving signals from said available channels;

an allocating circuit for allocating a predetermined number of said available channels to said base and handset units;

a squelch circuit coupled to said receiving circuit for detecting whether or not the allocated channels are busy in order to select a channel among the allocated channels, said squelch circuit monitoring the available channels to count the number of times when each of said available channels is busy; and a channel change circuit coupled to said squelch circuit for replacing said allocated channels with the available channels used less frequently than said allocated channels according to a combination of historical use data stored in said handset unit and historical use data stored in said base unit.

16. The system of claim 15, wherein said squelch circuit comprises a base squelch circuit in said base unit for detecting whether or not channels allocated to said base unit are busy.

17. The system of claim 16, wherein said channel change circuit comprises a base channel change circuit in said base unit for replacing the channels allocated to said base unit with the available channels used less frequently.

18. The system of claim 17, wherein said squelch circuit further comprises a handset squelch circuit in said handset unit for detecting whether or not channels allocated to said handset unit are busy.

19. The system of claim 18, wherein said channel change circuit further comprises a handset channel change circuit in said base unit for replacing the channels allocated to said handset unit with the available channels used less frequently.

20. The system of claim 19, wherein said handset channel change circuit receives data collected by said base squelch circuit.

21. The communication apparatus according to claim 15, wherein the combination of historical use data includes adding the historical use data stored in the handset unit and historical use data stored in the base unit.

* * * * *